(12) United States Patent
Watanabe (10) Patent No.: US 7,866,687 B2
(45) Date of Patent: Jan. 11, 2011

(54) VEHICULAR AIRBAG DEVICE

(75) Inventor: Masaya Watanabe, Chapultepee Morales Miguel Hidalgo Mexico (MX)

(73) Assignee: Nissan Motor Co., Ltd., Yokohama-shi (JP)

( * ) Notice: Subject to any disclaimer, the term of this patent is extended or adjusted under 35 U.S.C. 154(b) by 226 days.

(21) Appl. No.: 12/277,599

(22) Filed: Nov. 25, 2008

(65) Prior Publication Data

US 2009/0146398 A1    Jun. 11, 2009

(30) Foreign Application Priority Data

Dec. 6, 2007    (JP) .............................. 2007-315674

(51) Int. Cl.
*B60R 21/217* (2006.01)
(52) U.S. Cl. .................................... 280/728.2
(58) Field of Classification Search .............. 280/728.2, 280/731, 777, 779
See application file for complete search history.

(56) References Cited

U.S. PATENT DOCUMENTS

| | | | |
|---|---|---|---|
| 4,773,674 A | 9/1988 | Wierschem | |
| 6,951,348 B2 * | 10/2005 | Enders | 280/728.2 |
| 7,448,642 B2 * | 11/2008 | Boggess et al. | 280/728.2 |
| 7,641,221 B2 * | 1/2010 | Boggess et al. | 280/728.2 |
| 2007/0007753 A1 * | 1/2007 | Williams et al. | 280/728.2 |
| 2007/0235987 A1 * | 10/2007 | Boggess et al. | 280/728.2 |
| 2009/0026739 A1 * | 1/2009 | Boggess et al. | 280/728.2 |
| 2010/0066063 A1 * | 3/2010 | Boggess et al. | 280/728.2 |

FOREIGN PATENT DOCUMENTS

| | | |
|---|---|---|
| EP | 0 252 232 A2 | 1/1988 |
| JP | 05-270342 A | 10/1993 |
| JP | 9-123857 A | 5/1997 |
| JP | 9-123863 A | 5/1997 |
| JP | 2007-261585 A | 10/2007 |

* cited by examiner

*Primary Examiner*—Paul N Dickson
*Assistant Examiner*—Drew Brown
(74) *Attorney, Agent, or Firm*—Foley & Lardner LLP (57) ABSTRACT

A vehicular airbag device is disclosed as having a mounting bracket supported on a steering member via a fixing portion and extending upward, and an airbag module mounted on the mounting bracket at an upper area thereof. The mounting bracket has connecting portions, provided with front and rear slits, whereby when the airbag module encounters a load directed downward, the connecting portions are subjected to plastic deformation to rotate in a vehicle width direction to absorb energy of the resulting load.

8 Claims, 9 Drawing Sheets

FIG. 13 ical Patent Application Publica-
VEHICULAR AIRBAG DEVICE

BACKGROUND OF THE INVENTION

1. Field of the Invention

The present invention relates to a vehicular airbag device.

Related Art

2. Description of the Related Art

In the pasts, there has heretofore been known a technology in which a motor vehicle has an instrument panel in front of a vehicle compartment and an airbag device is mounted in the instrument panel (see Japanese Patent Application Publication No. 5-270342).

With the airbag device disclosed in Japanese Patent Application Publication No. 5-270342, a bracket is mounted on an upper area of a steering member extending in a vehicle width direction and an airbag module is mounted on the bracket at an upper area thereof.

SUMMARY OF THE INVENTION

With the airbag device disclosed in the related art, however, a bracket with high rigidity is mounted on the steering member at an upper portion thereof. Therefore, if a colliding object applies a load to an upper surface of an airbag with the airbag remaining deployed, the bracket encounters an issue with difficulty of efficiently absorbing energy of such an input load.

Thus, the present invention has been completed with the above view in mind and has an object to provide a vehicular airbag device that can efficiently absorb energy of a load applied to an airbag.

To achieve the above object, the present invention provides a vehicular airbag device comprising a mounting bracket having a fixing portion adapted to be fixedly secured to a steering member, connecting portions laterally extending from the fixing portion nearly along the steering member with the fixing portion being sandwiched, and support portions extending upward from the connecting portions, respectively. An airbag module is mounted on the support portions at upper areas of the support portions of the mounting bracket. When an airbag of the airbag module is deployed with the deployed airbag encountering a load directed downward, the connecting portions of the mounting bracket deform to rotate in a vehicle width direction so as to absorb energy of the load applied to the airbag.

With the vehicular airbag device according to the present invention, if the deployed airbag encounters the load directed downward, then the mounting bracket is caused to deform and rotate. This results in a capability of efficiently absorbing energy of the load applied to the airbag. As used herein, the term "deformation" refers to both of "plastic deformation" and "elastic deformation".

DETAILED DESCRIPTION OF THE EMBODIMENTS

Now, one embodiment of the present invention will be described below with reference to the accompanying drawings.

Figure 1:
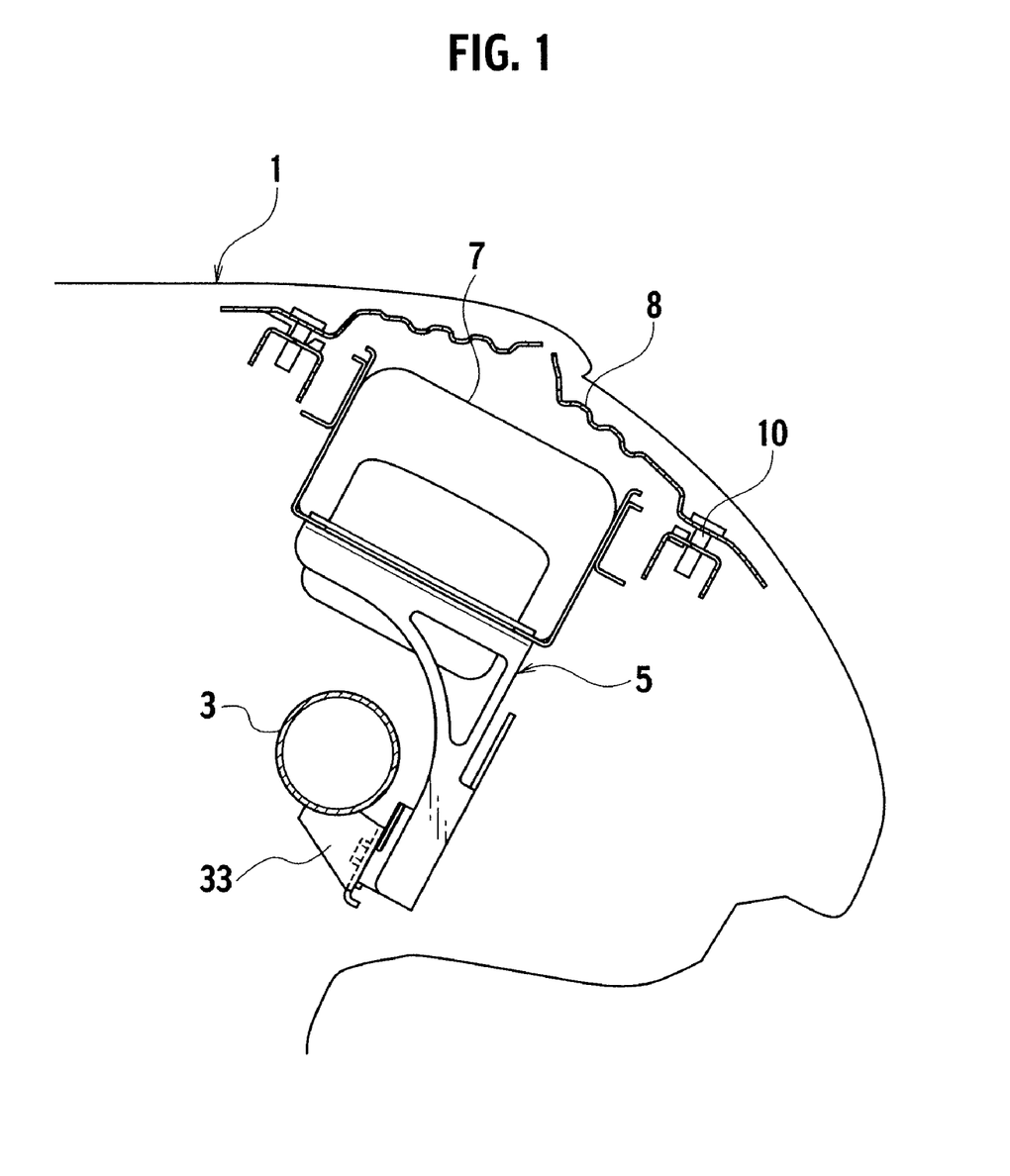
FIG. 1 is a cross-sectional view of an interior portion of an instrument panel, as viewed from a side thereof, in which an airbag device of one embodiment according to the present invention is located.

FIG. 1 is a cross-sectional view of an interior portion of an instrument panel, as viewed from a side area, in which an airbag device of one embodiment according to the present invention is installed.

A vehicle compartment has a front area in which the instrument panel 1, made of resin, is installed. The instrument panel 1 has an inside through which a cylindrical steering member 3 extends along a vehicle width direction. The steering member 3 carries thereon a mount portion 33 to which a mounting bracket 5 is fixedly mounted. The mounting bracket 5 has an upper portion to which an airbag module 7 is mounted. With the present embodiment, the airbag device 37 includes the mounting bracket 5 and the airbag module 7. In addition, lids 8, made of metal, are attached to the instrument panel 1 on a rear side thereof by means of stud pins 10. The lids 8 are released when the airbag device 37 is activated to expand an airbag, which is not shown.

Figure 2:
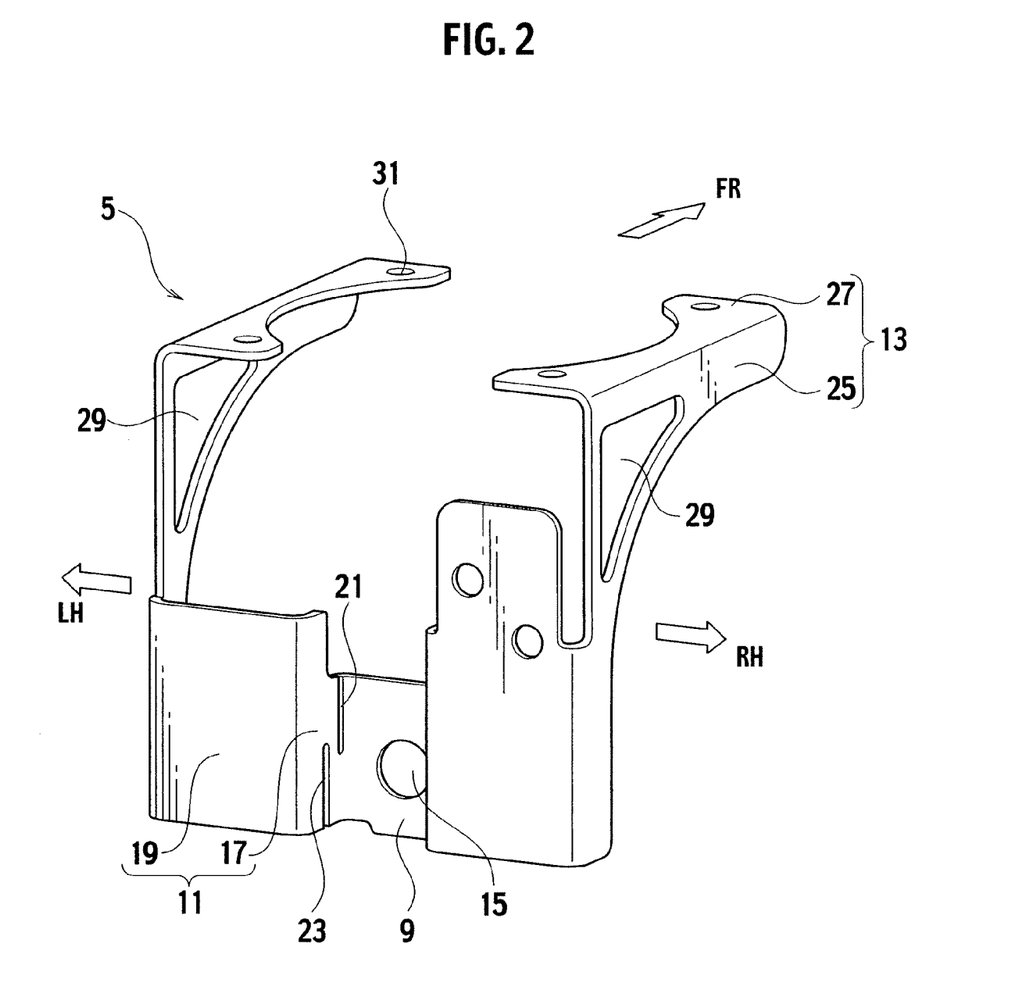
FIG. 2 is a perspective view showing a mounting bracket shown in FIG. 1.
Figure 3:
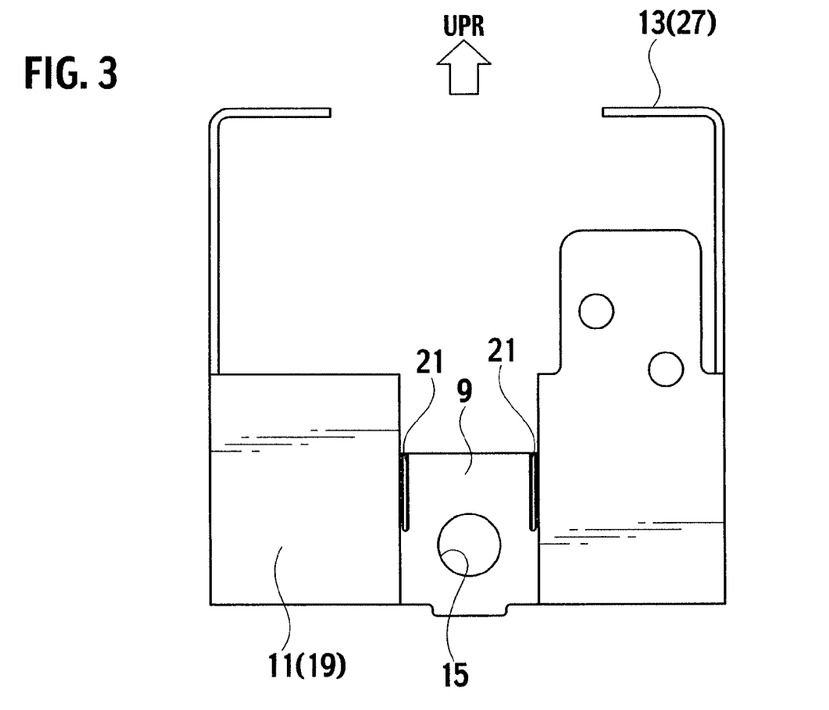
FIG. 3 is a front view of the mounting bracket as viewed from a rear of a vehicle.
Figure 4:
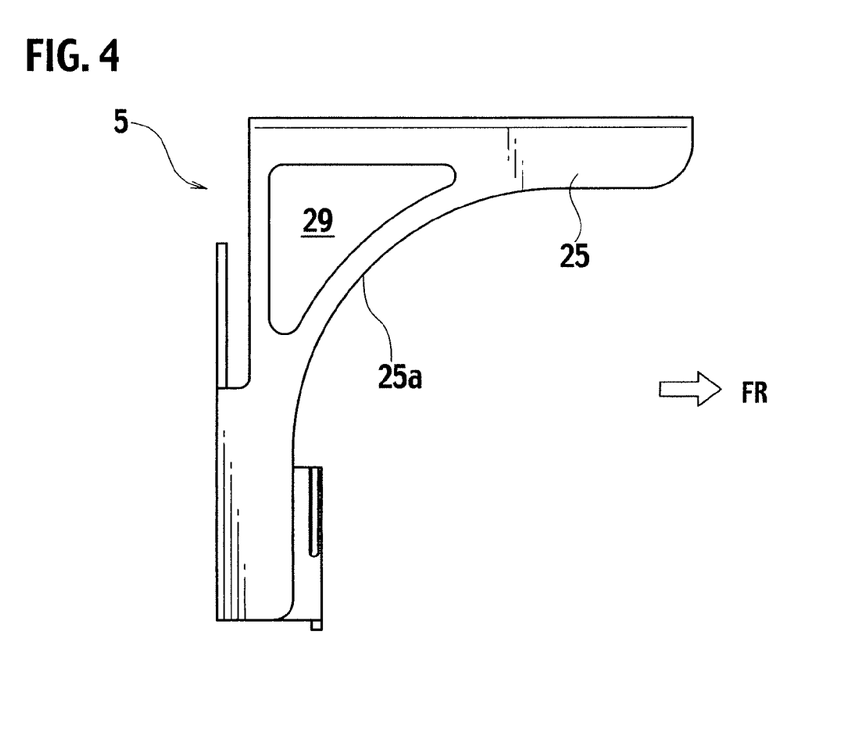
FIG. 4 is a side view of the mounting bracket as viewed from a side of the vehicle.

FIG. 2 is a perspective view showing the mounting bracket; FIG. 3 is a front view of the mounting bracket as viewed from a vehicle at a rear side thereof; and FIG. 4 is a side view of the mounting bracket as viewed from the vehicle at a side thereof.

As shown in FIG. 2, the mounting bracket 5 includes a fixing portion 9 placed in a lower portion in the vehicle width direction at a central area thereof, a pair of connecting portions 11 and 11 laterally extending from the fixing portion 9 on both sides thereof, and a pair of left and right support portions 13 and 13 placed on both sides of the connecting portions 11 and 11 and formed in a unitary structure.

As shown in FIG. 3, the fixing portion 9 is formed in a nearly rectangular shape as viewed from a front and has a central area formed with a circular bolt-mounting hole 15.

As shown in FIG. 2, further, the fixing portion 9 has both sides contiguous with the connecting portions 11 and 11, respectively, and has nearly L-shapes in cross section, respectively. That is, the connecting portions 11 and 11 include sidewalls 17, extending rearward from the left and right sides of the fixing portion 9, respectively, and rear walls 19 laterally extending from the sidewalls 17 at rear ends thereof, which are unitarily formed in nearly L-shapes in cross section. In addition, each sidewall 17 has a front-end portion (i.e. an area close proximity to the fixing portion 9) that has upper and lower end portions formed with a front slit 21 and a rear slit 23, respectively, both of which act as first weakened portions.

As shown in FIG. 2, furthermore, the connecting portions 11 have the rear walls 19 whose left and right sides are formed with the support portions 13 that extend in a fore and aft direction of the vehicle. The support portions 13 include sidewalls 25 extending forward from the rear walls 19 of the connecting portions 11 on left and right ends thereof, and upper walls 27 formed on the sidewalls 25 at upper ends thereof, respectively, which are formed in a unitary structure. As shown in FIG. 4, each sidewall 25 has a lower surface, formed in a nearly circular arc shape, and an upper portion whose corner area has an opening portion 29 formed in a nearly triangular shape as viewed from a side to function as a second weakened portion. Moreover, the upper walls 27 have support bores 31 for mounting the airbag module 7.

Figure 5:
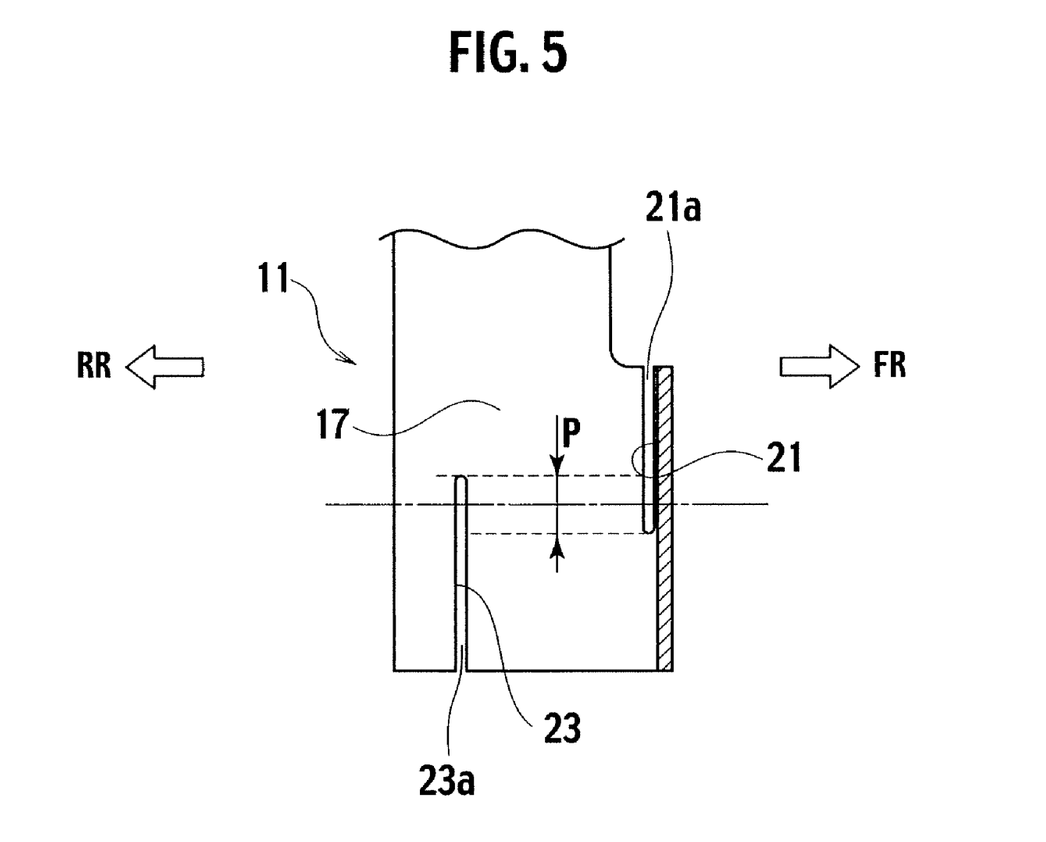
FIG. 5 is a side view of a connecting portion of the mounting bracket as viewed from the side of the vehicle.

FIG. 5 is a side view of each connecting portion, placed on the mounting bracket at a left side of the vehicle, which is viewed from the side of the vehicle.

As set forth above, the sidewall 17, forming part of the connecting portion 11, has front and rear areas formed with the slits 21 and 23 extending in a vertical direction, respectively, to form the first weakened portions. More particularly, the front area of the sidewall 17 has the front slit 21 vertically extending from an upper end to a lower area of the sidewall 17. The rear area of the sidewall 17 has the rear slit 23 vertically extending from a bottom end to an upper area of the sidewall 17. The front slit 21 and the rear slit 23 are spaced apart from each other in the fore and aft direction of the vehicle (i.e. under an offset state). The front slit 21 has an upper end formed with an open portion 21a and the rear slit 23 has a lower end formed with an opening portion 23a. The front slit 21 and the rear slit 23 overlap each other in an overlapping portion P in the fore and aft direction of the vehicle. Also, a single dot line indicates a centerline of the connecting portion 11.

Figure 6:
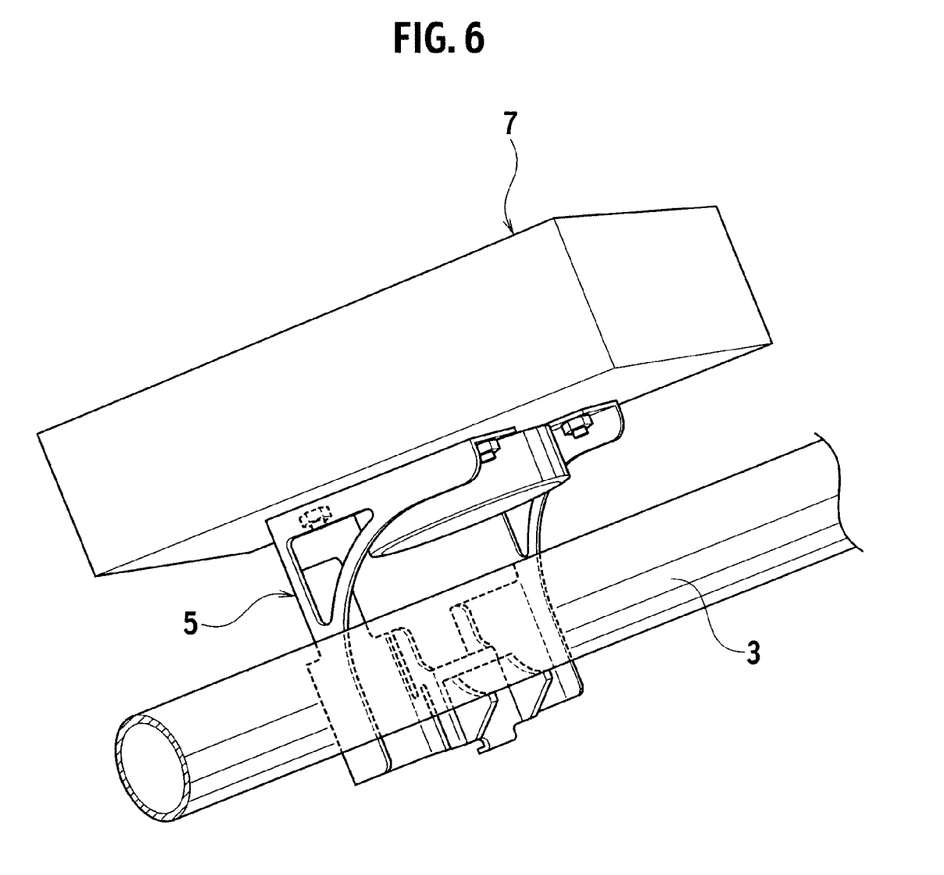
FIG. 6 is a perspective view showing the airbag device mounted on a steering member.
Figure 7:
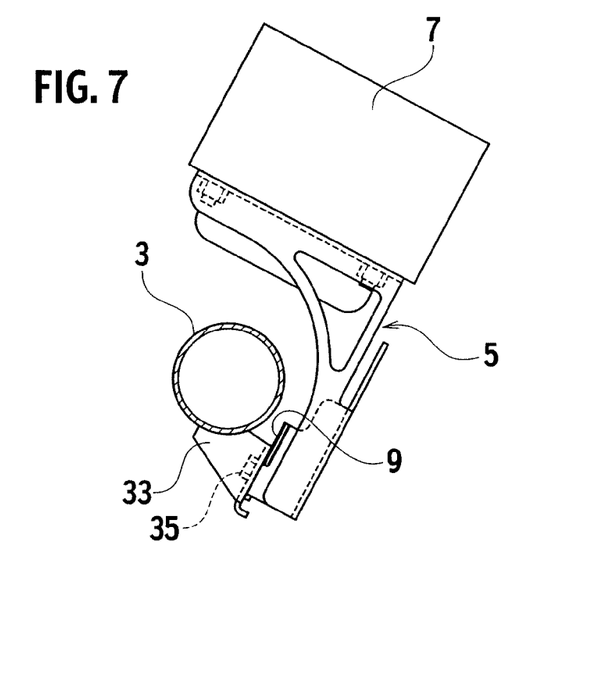
FIG. 7 is a side view of a structure shown in FIG. 6.
Figure 8:
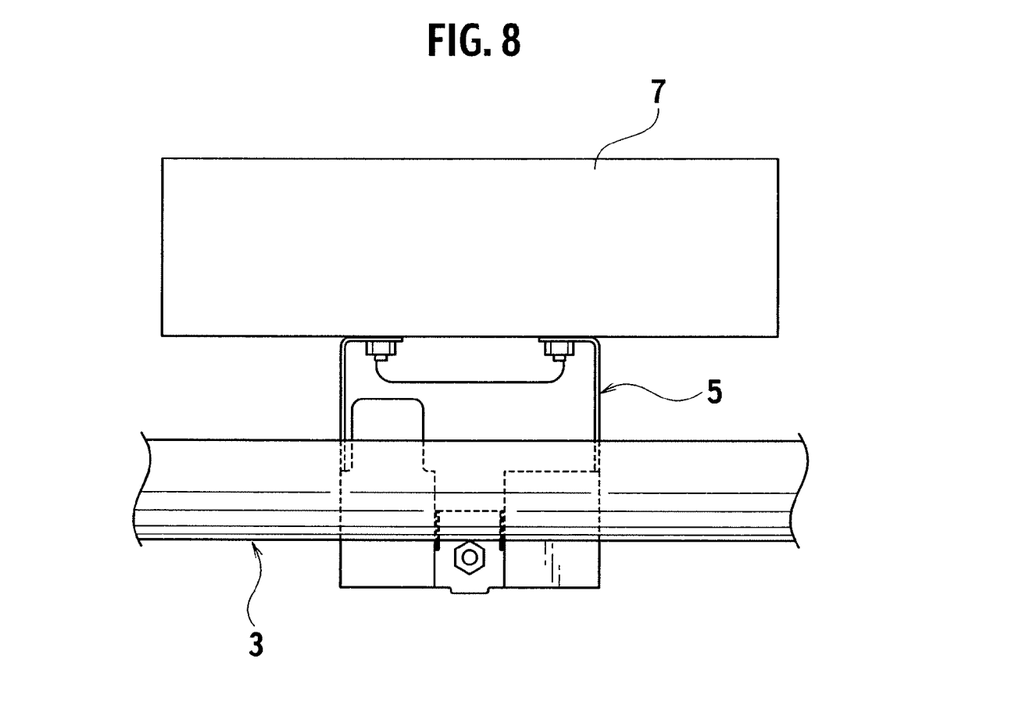
FIG. 8 is a front view showing the structure of FIG. 6 as viewed from the rear of the vehicle.

FIG. 6 is a perspective view showing the airbag device mounted on the steering member; FIG. 7 is a side view of the airbag device as viewed from the side of the vehicle; and FIG. 8 is a front view of the airbag device as viewed from the rear of the vehicle.

As shown in these drawing figures, the steering member 3 has a lower area to which the mount portion 33 is fixedly secured so as to extend rearward and downward in an oblique direction. The fixing portion 9 of the mounting bracket 5, shown in FIG. 2, is coupled to the mount portion 33 by means of bolts 35.

Referring to FIGS. 9 to 12, next, a deformation behavior of the mounting bracket is described below with reference to a case when a load is input to the airbag device of the present invention in a downward direction.

Figure 9:
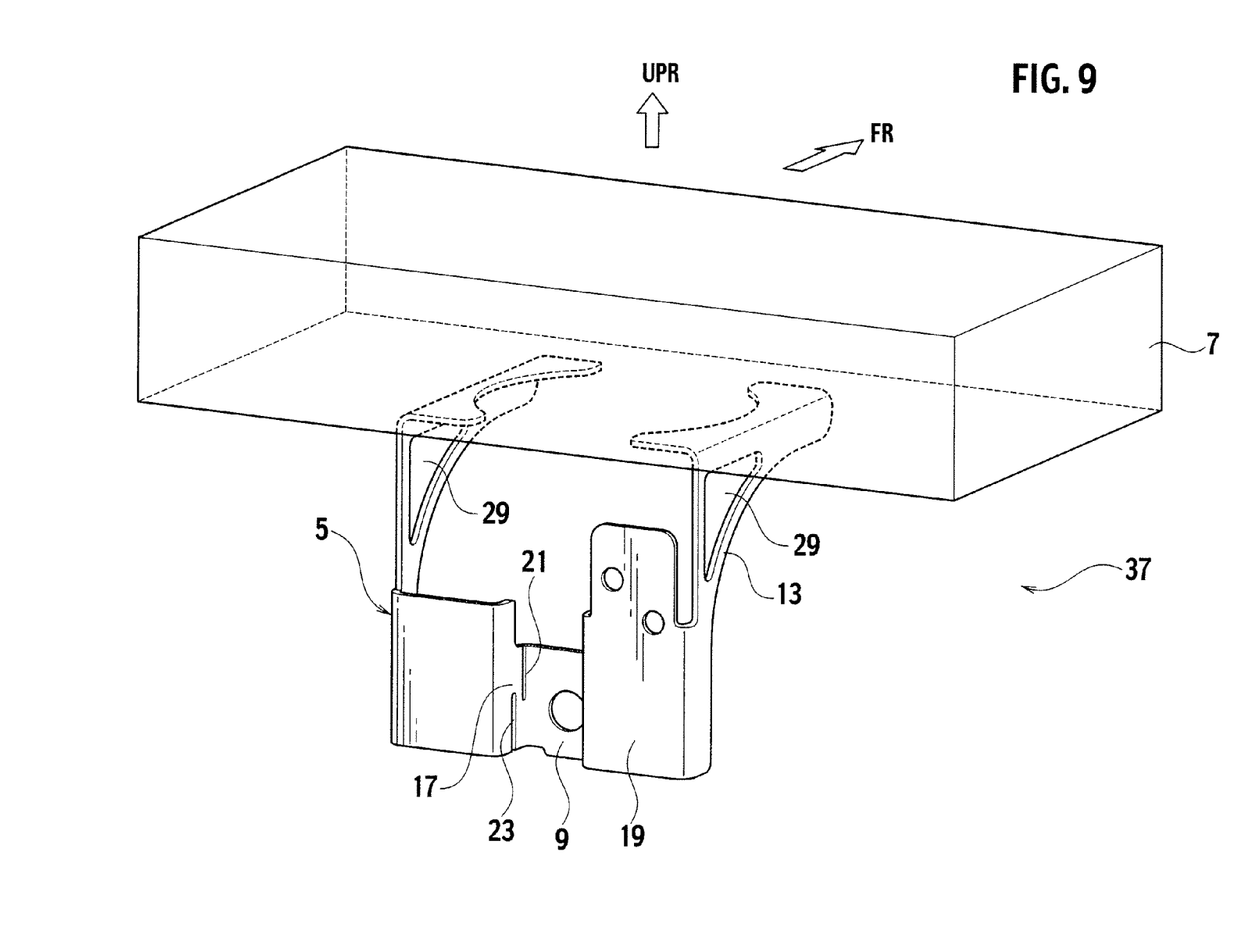
FIG. 9 is a perspective view schematically showing the airbag device.
Figure 10:
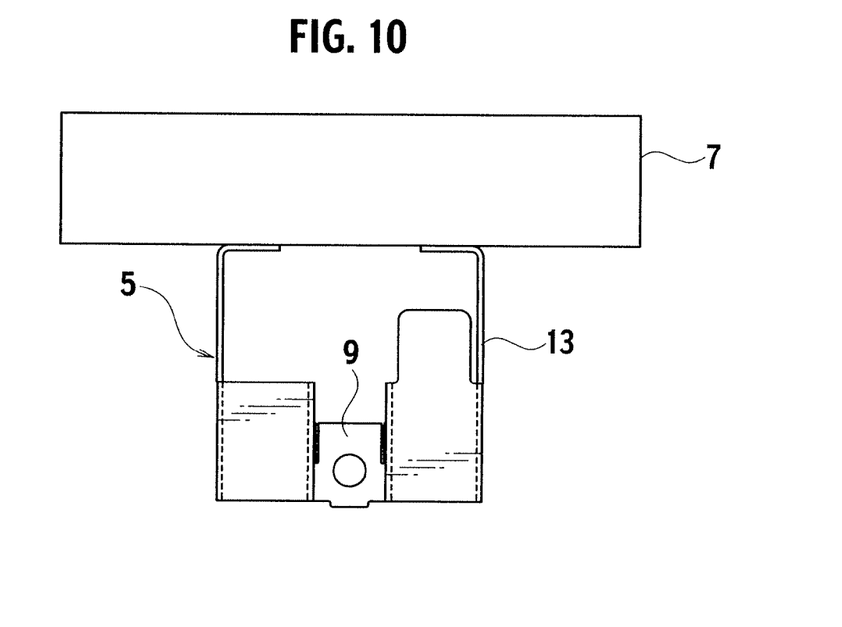
FIG. 10 is a schematic view showing the airbag device, remaining under a normal state, as viewed from the rear of the vehicle.

First, under a normal condition with the airbag device 37 remained inoperative, the airbag device 37 is placed in a status shown in FIGS. 9 and 10.

Figure 11:
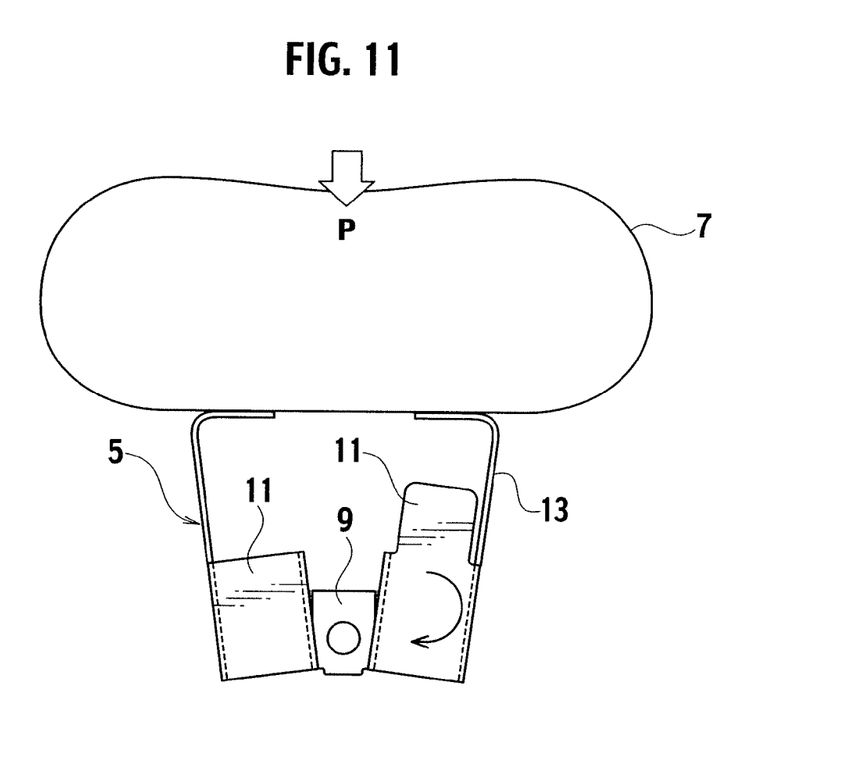
FIG. 11 is a schematic view showing a case under which the connecting portions are deformed when the airbag device, shown in FIG. 10, encounters a load directed downward.

As shown in FIG. 11, further, if the airbag device 37 is rendered operative, then the airbag module 7 is deployed. In this moment, if a load P is applied onto the deployed airbag module 7 in the downward direction as indicated by an arrow, then this load P is transferred to the connecting portion 11 and 11 via the support portions 13.

With the connecting portion 11 and 11, the left and right connecting portions 11 have the sidewalls 17, formed with the front and rear slits 21 and 23 described above with reference to FIG. 2, which are weakened to be easily deformable (especially in plastic deformation). Accordingly, the sidewalls 17 and 17 of the left and right connecting portions 11 and 11 deform about a center of the bolt-mounting hole 15 of the fixing portion 9. This causes the connecting portions 11 and the support portions 13 to rotate (as indicted by an arrow) as shown in FIG. 11. As a result of rotation due to such deformations, it becomes possible to efficiently absorb energy of the input load P oriented downward.

Figure 12:
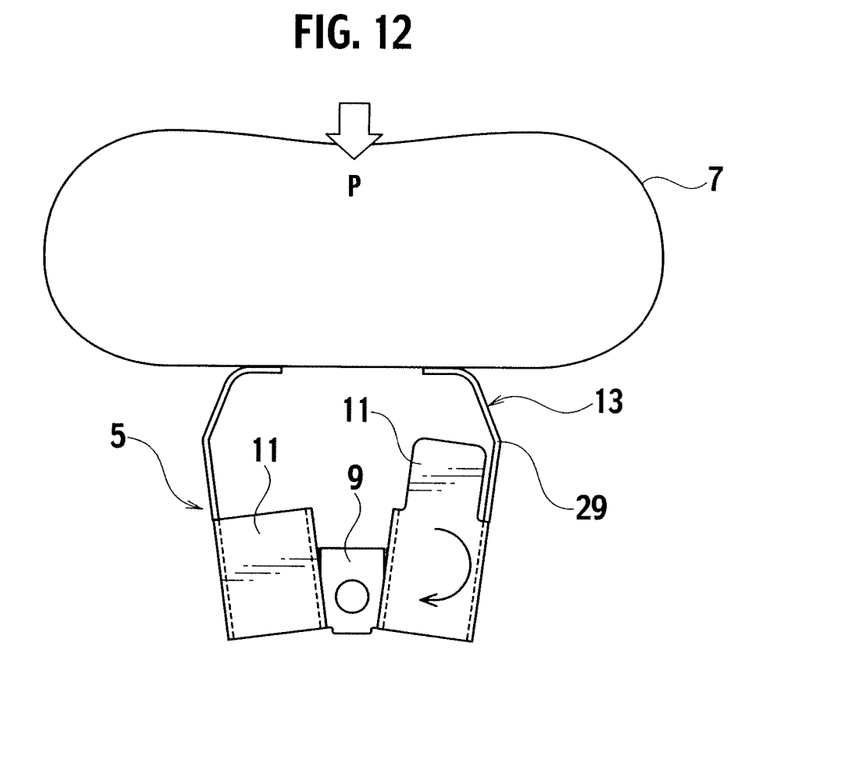
FIG. 12 is a perspective view schematically showing the airbag device on a right side of the vehicle with support portions and connecting portions being deformed.

Further, if the load P is great, then deformations occur on portions close proximity to the opening portions 29 formed on the support portions 13 to function as the second weakened portions as shown in FIG. 12. This enables the connecting portions 11 and the support portions 13 to rotate at accelerated rates, enabling energy of the load P to be further absorbed.

Hereunder, advantageous effects of the present embodiment will be described below.

The mounting bracket 5 is comprised of the fixing portion 9 supported on the steering member 3, the left and right support portions 13 onto which the airbag module 7 is mounted, and the connecting portions 11 through which the fixing portion 9 and the support portions 13 are connected to each other. The connecting portions 11 are provided with the front and rear slits 21 and 23 both of which form the first weakened portions. Therefore, if the airbag module 7 encounters the load P directed downward, the plastic deformation and rotation of the connecting portions 11 are accelerated, resulting in a capability of efficiently absorbing energy of the load P.

With the support portions 13 formed with the opening portions 29 acting as the second weakened portions 29, accelerating the plastic deformation and rotation of the support portions 13 results in a capability of further efficiently absorbing energy of the load P.

The connecting portions 11 and the support portions 13 are provided in pairs on both of left and right sides of the fixing portion 9 with a distance. The pair of connecting portions 11 and 11 has the front and rear slits 21 and 23, respectively, which function as the first weakened portions. This enables the left and right connecting portions 11 and 11 to absorb energy, resulting in an increased efficiency of absorbing energy.

The connecting portions 11 and the support portions 13 are provided in pairs on both of left and right sides of the fixing portion 9 with a distance. The pair of support portions 13 has the opening portions 29, respectively, which function as the second weakened portions. This enables the left and right support portions 13 to absorb energy, resulting in an increased efficiency of absorbing energy.

The first and second weakened portions are structured to allow the connecting portions 11 and the support portions 13 on both of the left and right sides to deform and rotate in directions opposite to each other as viewed from the front (i.e. when viewed a front at the rear of the vehicle) as shown in FIGS. 11 and 12 when the airbag module 7 encounters the load directed downward. Therefore, when the airbag module 7 encounters the load P directed downward, the connecting portions 11 and the support portions 13 on both of the left and right sides are caused to deform and rotate in directions opposite to each other, thereby enabling the left and right mounting brackets 5 to evenly absorb resulting energy.

Here, if the first and second weakened portions are provided on the vehicle at only a left side thereof or a right side thereof, a deformation occurs on only one side of the left and right connecting portions 11 in rotation. This results in a difficulty of efficiently absorbing energy of the input load P. However, like the structure of the present embodiment, providing the weakened portions in structure enabled to deform and rotate in directions opposite to each other on both of the left and right sides allows the mounting bracket 5 to evenly absorb energy, resulting in an increase in energy-absorbing efficiency.

The fixing portion 9 and the connecting portions 11 are placed in the position directed rearward in the oblique direction. The steering member 3 has an obliquely rearward and lower area with a relatively increased space. This allows the fixing portion 9 and the connecting portions 11 to be placed in such an area, enabling the connecting portions 11 and the support portions 13 to rotate with no interference with other component parts.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

Figure 13:
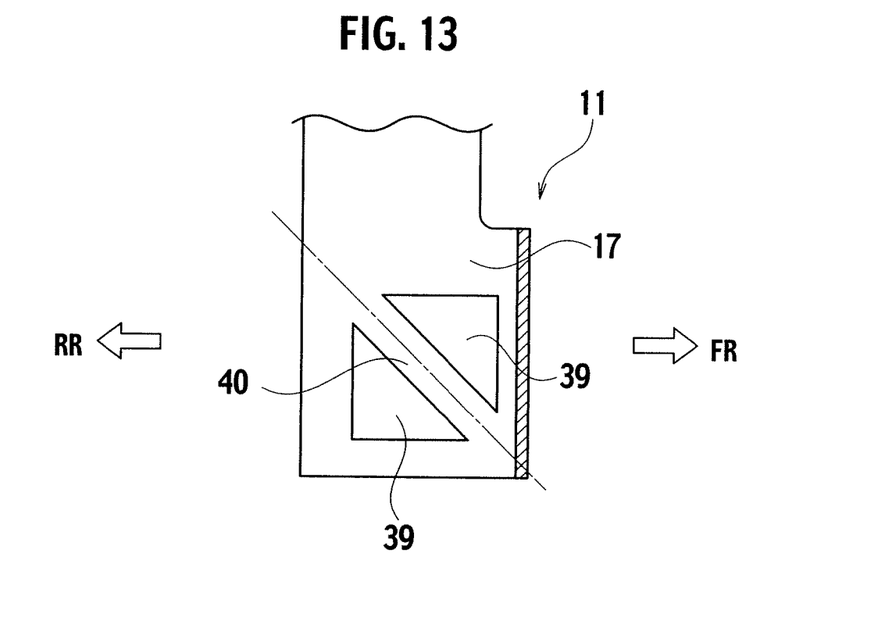
FIG. 13 is a schematic view of the other embodiment showing a connecting portion provided with a first weakened portion.

For instance, the first weakened portions are not limited to the front and rear slits 21 and 23 shown in FIG. 5 and may adopt the form of openings 39 and 39 as shown in FIG. 13. The openings 39 and 39 are formed by hollowing out the sidewalls 17 in a pair of triangles symmetric to each other with respect to a leg portion 40 extending forward and downward in an oblique direction, with an area indicated by a single dot line in FIG. 13 serving as a rotation center.

With the structure shown in FIG. 5, further, although the front slit 21 is placed in the upper area and the rear slit 23 is placed in the lower area, these slits may be provided in positions opposite to those described above such that the front slit remains downward and the rear slit remains upward.

CROSS REFERENCE TO RELATED APPLICATIONS

The entire content of Japanese Patent Application No. 2007-315674 with a filing date of Dec. 6, 2007 in Japan is hereby incorporated by reference.

What is claimed is:

1. A vehicular airbag device comprising:
   a mounting bracket having a fixing portion adapted to be fixedly secured to a steering member, connecting portions laterally extending from the fixing portion nearly along the steering member with the fixing portion being sandwiched, and support portions extending upward from the connecting portions, respectively; and
   an airbag module mounted on the support portions at upper areas of the support portions of the mounting bracket;
   wherein when an airbag of the airbag module is deployed with the deployed airbag encountering a load directed downward, the connecting portions of the mounting bracket deform to rotate in a vehicle width direction so as to absorb energy of the load applied to the airbag.

2. The vehicular airbag device according to claim 1, wherein:
   the connecting portions have first weakened portions operative to deform and rotate.

3. The vehicular airbag device according to claim 2, wherein:
   the first weakened portions, provided on the connecting portions, include pluralities of slits, offset in a fore and aft direction of a vehicle to extend in a vertical direction, which have upper or lower ends formed with open portions overlapping with each other in the fore and aft direction of the vehicle in an overlapped portion.

4. The vehicular airbag device according to claim 2, wherein:
   the first weakened portions, provided on the connecting portions, include triangular-shaped openings placed in symmetric relation across a leg portion obliquely extending in the fore and aft direction of the vehicle.

5. The vehicular airbag device according to claim 2, wherein:
   at least one of the support portions has a second weakened portion operative to cause the support portion to deform to rotate the connecting portion when the airbag module encounters the load directed downward.

6. The vehicular airbag device according to claim 2, wherein:
   both of the support portions have second weakened portions.

7. The vehicular airbag device according to claim 2, wherein:
   the first weakened portions are structured to cause the connecting portions and the support portions on both of left and right sides to deform and rotate in opposite directions as viewed in a front.

8. The vehicular airbag device according to claim 1, wherein:
   the fixing portion and the connecting portions are disposed on the steering member at rearward and lower areas thereof in an oblique direction.

* * * * *